Figure 1:
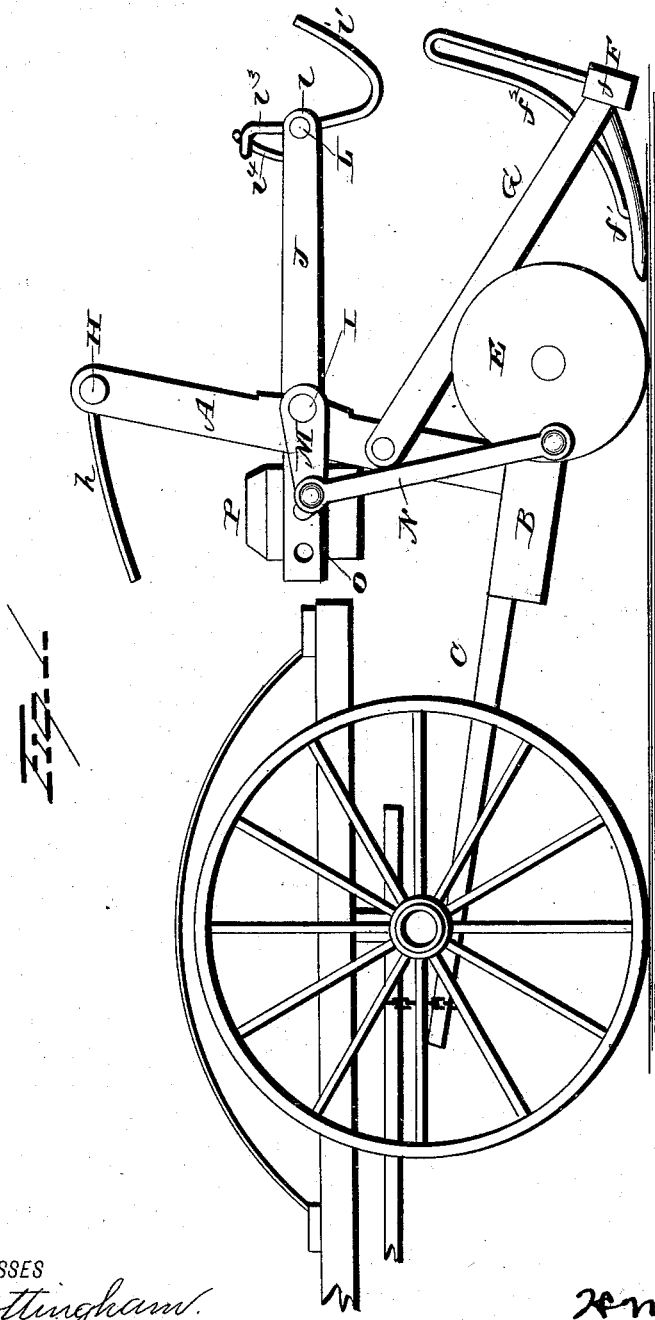

(No Model.)

2 Sheets—Sheet 1.

H. M. KELLER.
HAY LOADER.

No. 261,725.                    Patented July 25, 1882.

WITNESSES
S. J. Nottingham.
Geo. F. Downing

INVENTOR
H. M. Keller.
By H. A. Seymour,
Attorney (No Model.) 2 Sheets—Sheet 2.
H. M. KELLER.
HAY LOADER.
No. 261,725. Patented July 25, 1882.
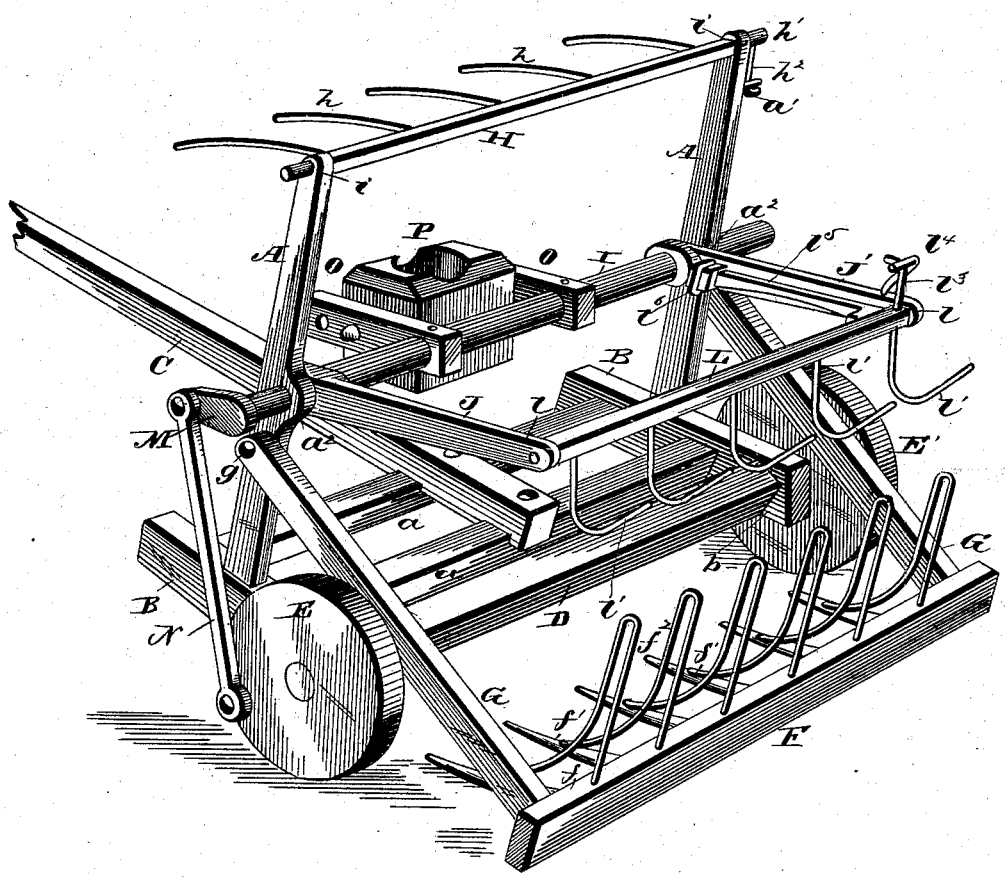
WITNESSES
S. G. Nottingham.
Geo. F. Downing.
INVENTOR
H. M. Keller.
By H. A. Seymour
Attorney

UNITED STATES PATENT OFFICE.

HENRY M. KELLER, OF NEWARK, OHIO.

HAY-LOADER.

SPECIFICATION forming part of Letters Patent No. 261,725, dated July 25, 1882.

Application filed May 29, 1882. (No model.)

*To all whom it may concern:*

Be it known that I, HENRY M. KELLER, of Newark, in the county of Licking and State of Ohio, have invented certain new and useful Improvements in Hay-Loaders; and I do hereby declare the following to be a full, clear, and exact description of the invention, such as will enable others skilled in the art to which it pertains to make and use the same.

My invention relates to hay-loaders, the object being to provide a hay-loader adapted to be attached to the rear end of a wagon to automatically raise the hay upon the wagon in small bundles or forkfuls from the rake.

The invention consists in the combination, with a rake and a supporting-frame, of a pivoted fork and devices for automatically raising and lowering the fork, as hereinafter fully described, and pointed out in the claims.

In the drawings, Figure 1 represents a side elevation of my improvement applied to the rear end of a hay-wagon. Fig. 2 represents a perspective view of my improved loader.

The frame of the loader consists of standards A A, secured to base blocks or bars B B, which latter are connected by cross-bars $a$, upon which is centrally secured a tongue, C, by means of which the device is secured to a wagon.

D represents a shaft or axle mounted in bearings $b\ b$, formed at the rear ends of the blocks B. Upon the ends of the shaft D are mounted wheels E E'.

F represents the rake, consisting of a bar, $f$, provided with downwardly-inclined teeth, $f'$, and upwardly-projecting guard-loops, $f^2$. To each end of the rake-bar $f$ is rigidly secured the rear end of an arm, G, the forward ends of the latter being pivoted by pivots $g$ to the standards A A at points approximating one-third of the height of said standards.

H represents a finger-bar provided with fingers $h$, and journaled in bearings $i$ in the upper ends of the standards A A. One end, $h'$, of the bar H projects beyond the standard A, and is provided with a depending hook, $h^2$, which is adapted to bear against a laterally-projecting stud, $a'$, of the standard.

I represents a crank-shaft mounted in bearings $a^2\ a^2$, formed on the rear side of the standards, at about the center of the latter. This shaft I is provided at either end and adjacent to the standards A A with rearwardly-projecting arms, J J', which are perforated at their rear ends to form bearings $l\ l$ for the fork L. The latter is supported pivotally in its bearings, and is provided with rearwardly-curved prongs, $l'$, arranged to register with the spaces between the teeth $f'$ of the rake. At one end of the fork L is arranged a forwardly-projecting hook, $l^3$, adapted to engage an inwardly-bent stop, $l^4$, on the arm J'. On the inner side of the latter, and parallel therewith, is arranged a spring, $l^5$, the forward end of which is secured by a staple, $l^6$, on the side of the arm J', while the rear end is provided with an inwardly-projecting lug, with which the hook $l^3$ is adapted to engage.

M represents a crank secured upon one end of the shaft I, and connected by a link, N, to the wheel E, said link being eccentrically pivoted to said wheel, as shown.

O O represent forwardly-projecting arms secured upon the shaft I, and supporting between them a suitable weight or counterpoise, P.

The operation of the improvement as thus constructed is as follows: The device may be secured to a wagon by means of the tongue C, as shown in Fig. 1. The wheels E E' will rest on the ground, and the rake F will be held by its gravity in position to rake the hay. The revolution of the wheel E will alternately raise and lower the fork L through the medium of the crank-shaft I, crank M, and link N. Thus the hay resting upon the teeth $f'$ and guards $f^2$ will be gathered by the prongs $l'$ and carried by the movement of the fork over the finger-bar H and onto the wagon, the fingers $h$ serving to guide the hay in its passage. The weight P operates to counterbalance and steady the fork.

As above described, the fork has a pivotal movement, which is limited by the contact of the hook $l^3$ with the spring $l^5$ and the stop $l^4$.

My improvement as above described is simple and durable in construction, may be readily attached to a wagon, and is entirely automatic in its operation.

I do not limit myself to the precise construction shown and described, but reserve to myself the right to make such alterations as may properly fall within the scope of my invention.

Having fully described my invention, what I claim as new, and desire to secure by Letters Patent, is—

1. In a hay-loader, the combination, with the standards and base-blocks, of a shaft supported in bearings of the latter and carrying ground-wheels, a rake provided with inclined teeth and guard-loops and secured to arms which are pivoted to said standards, a crank-shaft supported in bearings of the standards and carrying the fork, said crank-shaft being connected by a crank and link to one of the ground-wheels, substantially as set forth.

2. In a hay-loader, the combination, with a frame adapted to be secured to a wagon, of the wheel-shaft and wheels, a rake secured by pivoted arms to the standards of the frame, a crank-shaft supported in bearings of said standards and carrying the fork and provided with a weight or counterpoise, and a pivoted finger-bar arranged at the upper ends of the standards, substantially as set forth.

3. In a hay-loader, the combination, with the rake and the standards, one of which is provided with a laterally-projecting stud, of a finger-bar supported in bearings of the standards and provided with a depending hook adapted to engage said stud, the weighted crank-shaft, arms $J$ $J'$, and fork $L$, the latter being provided with prongs $l'$, hook $l^3$, and a spring, $l^5$, and stops $l$, all arranged substantially as set forth.

In testimony whereof I have signed this specification in the presence of two subscribing witnesses.

HENRY MILLER KELLER.

Witnesses:
 THOMAS J. PRIOR,
 GUS. M. CHARTERS